(12) United States Patent
Tsujii et al.

(10) Patent No.: US 9,079,153 B2
(45) Date of Patent: Jul. 14, 2015

(54) CATALYTIC REACTOR

(75) Inventors: Junichi Tsujii, Hyogo (JP); Naoki Kashi, Hyogo (JP)

(73) Assignee: Sumitomo Precision Products Co., Ltd., Hyogo (JP)

( * ) Notice: Subject to any disclaimer, the term of this patent is extended or adjusted under 35 U.S.C. 154(b) by 538 days.

(21) Appl. No.: 13/395,973

(22) PCT Filed: Sep. 6, 2010

(86) PCT No.: PCT/JP2010/005458
§ 371 (c)(1),
(2), (4) Date: Mar. 14, 2012

(87) PCT Pub. No.: WO2011/033737
PCT Pub. Date: Mar. 24, 2011

(65) Prior Publication Data
US 2012/0177550 A1   Jul. 12, 2012

(30) Foreign Application Priority Data

Sep. 16, 2009   (JP) ................................ 2009-214309

(51) Int. Cl.
| | |
|---|---|
| *B01J 19/24* | (2006.01) |
| *B01J 35/02* | (2006.01) |
| *B01J 37/02* | (2006.01) |
| *C10G 2/00* | (2006.01) |
| *B01J 19/00* | (2006.01) |
| *B01J 7/00* | (2006.01) |
| *B01J 15/00* | (2006.01) |
| *B01J 16/00* | (2006.01) |
| *B01J 35/00* | (2006.01) |
| *B01J 23/44* | (2006.01) |
| *B01J 23/46* | (2006.01) |
| *B01J 23/89* | (2006.01) |

(52) U.S. Cl.
CPC .............. *B01J 19/249* (2013.01); *B01J 35/026* (2013.01); *B01J 37/0225* (2013.01); *C10G 2/341* (2013.01);
(Continued)

(58) Field of Classification Search
CPC ............ B01J 7/00; B01J 15/00; B01J 15/005; B01J 16/00; B01J 16/005; B01J 19/00; B01J 19/0046; B01J 19/24; B01J 35/00
USPC ......... 422/129, 130, 168–171, 187, 600–603, 422/198
See application file for complete search history.

(56) References Cited

U.S. PATENT DOCUMENTS

2003/0105172 A1   6/2003   Bowe et al.
2005/0234138 A1   10/2005   Bowe
(Continued)

FOREIGN PATENT DOCUMENTS

CN   1416361 A   5/2003
CN   1553826 A   12/2004
(Continued)

OTHER PUBLICATIONS

Extended European Search Report for corresponding European Application No. 10816852.7 dated Feb. 13, 2014.
(Continued)

*Primary Examiner* — Natasha Young
(74) *Attorney, Agent, or Firm* — Renner, Otto, Boisselle & Sklar, LLP (57) ABSTRACT

A catalytic reactor includes a pair of plates arranged in parallel at a predetermined interval so as to form a path in which fluid flows; a channel member bonded to the plates in the path to divide the path into channels; and a catalyst carrier inserted into each of the channels and extending along the each of the channels. At least one of the pair of plates serves as a first heat-transfer surface when contacting a temperature medium having a temperature zone different from a temperature zone in the path and exchanging heat with the temperature medium. Each of the channels has a cross section for which an aspect ratio (W/H) of a width to a height is equal to or less than 1, and the catalyst carrier includes a wave-shaped base having a single piece structure, and a catalyst formed on a surface of the base.

4 Claims, 3 Drawing Sheets (52) U.S. Cl.
CPC ............... *B01J 23/44* (2013.01); *B01J 23/464* (2013.01); *B01J 23/894* (2013.01); *B01J 23/8913* (2013.01); *B01J 2219/2453* (2013.01); *B01J 2219/2458* (2013.01); *B01J 2219/2462* (2013.01); *B01J 2219/2465* (2013.01); *B01J 2219/2479* (2013.01); *B01J 2219/2482* (2013.01); *B01J 2219/2497* (2013.01); *B01J 2219/2498* (2013.01)

(56) References Cited

U.S. PATENT DOCUMENTS

| | | |
|---|---|---|
| 2006/0076127 A1 | 4/2006 | Bowe et al. |
| 2007/0258872 A1 | 11/2007 | West et al. |
| 2007/0258883 A1 | 11/2007 | West et al. |
| 2008/0193347 A1 | 8/2008 | Lee-Tuffnell |
| 2012/0142789 A1 * | 6/2012 | Morgan et al. ............... 518/702 |

FOREIGN PATENT DOCUMENTS

| | | |
|---|---|---|
| EA | 200870512 A1 | 4/2009 |
| JP | 06-345404 A | 12/1994 |
| JP | 08-117608 A | 5/1996 |
| WO | 2006/079848 | 8/2006 |
| WO | WO 2006/095204 A1 * | 9/2006 |
| WO | WO 2009/081175 A1 | 7/2009 |
| WO | WO 2010/046700 A1 | 4/2010 |

OTHER PUBLICATIONS

International Search Report for corresponding International Application No. PCT/JP2010/005458 mailed Dec. 7, 2010.

Form PCT/ISA/237 for corresponding International Application No. PCT/JP2010/005458 dated Dec. 7, 2010.

* cited by examiner

CATALYTIC REACTOR

The application is a National Stage of International patent application PCT/JP2010/005458, now WO 2011/033737, filed on Sep. 6, 2010, which claims priority to foreign patent application No. JP 2009-214309, filed on Sep. 16, 2009, the disclosures of which are incorporated by reference in their entirety.

TECHNICAL FIELD

A technique disclosed herein broadly relates to a catalytic reactor.

BACKGROUND ART

For example, Patent Document 1 discloses a catalytic reactor suitable as a reactor for performing, in particular, a Fischer-Tropsch reaction (hereinafter referred to as a FT reaction) in a gas-to-liquid (GTL) process in which synthesis is performed to generate liquid fuel from raw material gas. The FT reaction is an exothermic reaction caused at a high temperature of about 200° C. in the presence of a catalyst. In order to enhance heat exchange efficiency and reaction efficiency, the catalytic reactor has a structure similar to that of a so-called "plate-fin heat exchanger" in which a tube plate and a corrugated fin are alternately stacked. Specifically, in the catalytic reactor, a catalytic structure is inserted into each of minute flow paths defined by the corrugated fins. The catalytic structure has a triple layer structure in which three plates each having a wave-shaped cross section are stacked with a flat plate being interposed between adjacent ones of the plates.

CITATION LIST

Patent Document

PATENT DOCUMENT 1: International Publication No. 2006/079848

SUMMARY OF THE INVENTION

Technical Problem

The catalytic reactor has relatively high internal pressure, and the tube plate receives a force in a direction in which opposing ones of the tube plates are apart from each other, due to the high internal pressure. In order to withstand such internal pressure, it is necessary that the thickness of the tube plate is increased or the thickness of the corrugated fin functioning as a reinforcing member between adjacent ones of the tube plates is increased. This results in an increase in size and weight of the catalytic reactor.

Thus, the inventors of the present invention have focused on vertical elongation of a cross-sectional shape of the minute flow path of the catalytic reactor. Since an interval between walls of the corrugated fin is narrowed by the vertical elongation of the cross-sectional shape, an area of the tube plate receiving the internal pressure is reduced (i.e., a distance between the walls of the corrugated fin is shortened). Thus, e.g., flexural deformation of the tube plate is reduced, and therefore the tube plate withstands the high internal pressure. Consequently, the vertical elongation of the cross-sectional shape of the minute flow path of the catalytic reactor allows a reduction in thickness of the tube plate and the corrugated fin, thereby realizing a small lightweight catalytic reactor.

However, the inventors of the present invention have found that, if the cross-sectional shape of the minute flow path is vertically elongated and the multilayer catalytic structure as disclosed in Patent Document 1 is inserted into the minute flow path, another problem that the heat exchange efficiency is degraded is newly caused. The reason why such a problem is caused is as follows. That is, if the cross-sectional shape of the flow path is vertically elongated, a distance from a center position of the cross section of the flow path to a first heat-transfer surface (i.e., the tube plate) becomes relatively long. This means a difficulty of a heat transfer in the minute flow path, and the vertically-elongated cross-sectional shape of the minute flow path is disadvantageous to the heat exchange efficiency. On the other hand, it is likely that the multilayer catalytic structure as disclosed in Patent Document 1 blocks fluid movement, in particular, in a direction perpendicular to a flow direction in the flow path. That is, since the plates each having the wave-shaped cross section and the flat plate are stacked in the catalytic structure, many closed spaces are arranged in parallel as viewed in the cross section of the catalytic structure. The catalytic structure is advantageous to an increase in catalyst area. However, since each of the closed spaces does not open to the tube plate or the corrugated fin, the movement of fluid flowing in each of the closed spaces in the direction perpendicular to the flow direction is restricted. As a result of combining two factors which are the increase in distance to the first heat-transfer surface and the blocking of the fluid movement in the direction perpendicular to the flow direction, heat is concentrated around the center of each of the flow paths, and the heat exchange efficiency of the catalytic reactor is degraded. This results in degradation of the reaction efficiency.

Solution to the Problem

The technique disclosed herein realizes a small lightweight catalytic reactor for which heat exchange efficiency is enhanced and degradation of reaction efficiency is prevented.

The inventors of the present invention combine a channel having a square or vertically-elongated cross section and a wave-shaped catalyst carrier having a single piece structure, thereby realizing both of the reduction in size and weight of the catalytic reactor and the prevention of the degradation of the reaction efficiency.

Specifically, the catalytic reactor disclosed herein includes a pair of flat plates arranged in parallel at a predetermined interval so as to form a path in which fluid flows; a channel member bonded to the flat plates in the path to divide the path into a plurality of channels arranged in parallel; and a catalyst carrier inserted into each of the channels and extending along the each of the channels. One of opposing surfaces of at least one of the pair of flat plates, which is on an opposite side of the other surface defining the path, serves as a first heat-transfer surface when contacting a temperature medium having a temperature zone different from a temperature zone in the path and exchanging heat with the temperature medium. The channel member bonded to the flat plates serves as a second heat-transfer surface.

In addition, each of the channels has a cross section for which an aspect ratio (W/H) of a width W to a height H corresponding to a stacking direction of the flat plates is equal to or less than 1. The catalyst carrier includes a wave-shaped base having a single piece structure, and a catalyst formed on a surface of the base.

The "first heat-transfer surface" means a heat-transfer surface, i.e., the flat plate interposed between the path in which fluid flows and the temperature medium to directly exchange heat between the path and the temperature medium. The "second heat-transfer surface" means a heat-transfer surface, i.e., the channel member which is bonded to the flat plate to transfer heat (e.g., perform heat conduction) to the flat plate and therefore is indirectly associated with the heat exchange between the path in which fluid flows and the temperature medium. In addition, the "channel" as used herein means flow paths into which the path is divided by the channel member and in each of which fluid flows.

Since the channel formed in the path is configured such that the aspect ratio (width W/height H) is equal to or less than 1, the channel is in a square or vertically-elongated shape, and is not in a horizontally-elongated shape. A direction indicated by the term "vertically" corresponds to an arrangement direction of the flat plates, and a direction indicated by the term "horizontally" corresponds to an arrangement direction of the channels perpendicular to the direction indicated by the term "vertically." The square or vertically-elongated channel allows a relatively-small pitch of the channel member, thereby shortening a distance (equivalent to the pitch of the channel member) of the flat plate receiving internal pressure. Thus, even if the thickness of the flat plate is reduced, the flat plate can withstand the high internal pressure in the path, and the thickness of the channel member can be reduced. This is advantageous to the reduction in size and weight of the catalytic reactor.

On the other hand, the wave-shaped base of the catalyst carrier inserted into each of the channels has the single piece structure. The "single piece structure" as used herein means not a structure in which, e.g., a plurality of members having different shapes are stacked in tiers, but a structure including a single member. For example, a single plate member including a plurality of layers made of different materials may be regarded as the single piece structure. When the wave-shaped base having the single piece structure is inserted into the channel, such a base is arranged so as to extend across the entirety of the cross section of the channel, and a plurality of spaces opening to the flat plate (i.e., the first heat-transfer surface) or the channel member (i.e., the second heat-transfer surface) are formed. Thus, the wave-shaped catalyst carrier having the single piece structure does not block fluid movement in the channel, in particular, fluid movement in a direction perpendicular to a flow direction. As a result, although the square or vertically-elongated channel allows a relative increase in distance from a center position of the channel to the first heat-transfer surface, a heat transfer is not blocked because of the smooth fluid movement in the direction perpendicular to the flow direction in the channel, thereby preventing the degradation of the heat exchange efficiency or improving the heat exchange efficiency. In addition, the wave-shaped catalyst carrier allows an increase in catalyst area, and therefore is advantageous to the enhancement of the catalytic reaction efficiency in the channel.

Thus, in the catalytic reactor, the reduction in size and weight of the catalytic reactor and the prevention of the degradation of the reaction efficiency can be realized.

The width W of the channel may be 3-7 mm. Since an extremely large width W of the channel results in a larger pitch of the channel member, it is difficult to reduce the thickness of the flat plate and the channel member. Considering the foregoing point, the upper limit of the width W is preferably 7 mm. The upper limit of the width W may be 5 mm. On the other hand, if the width W of the channel is extremely small, it is difficult to insert the catalyst carrier into the channel, and therefore a disadvantage in manufacturing of the catalytic reactor is caused. Considering the foregoing point, the lower limit of the width W is preferably 3 mm.

The height H of the channel may be 7-20 mm. If the height H of the channel is extremely high, the length of the channel member arranged between a pair of the flat plates to function as a reinforcing member is increased, and therefore it is necessary that the thickness of the channel member is increased to ensure stiffness of the channel member. Considering the foregoing point, the upper limit of the height H is preferably 20 mm. The upper limit of the height H may be 10 mm. On the other hand, if the height H of the channel is extremely small, it is difficult to insert the catalyst carrier into the channel, and therefore a disadvantage in manufacturing of the catalytic reactor is caused. Considering the foregoing point, the lower limit of the height H is preferably 7 mm.

A plurality of flat plates may be arranged in parallel at predetermined intervals, and each of the flat plates may divide between adjacent ones of a plurality of paths such that the paths are stacked in tiers. The plurality of paths may include a first path in which first fluid flows and a second path in which second fluid flows, and the first and second paths may be alternately arranged in tiers. The channel member may divide each of the first and second path into the channels. The catalyst carrier may be inserted into each of the channels in at least one of the first or second path, and the at least one of the first or second path may serve as a catalytic reaction path. Each of the channels of the catalytic reaction path may have a cross section for which the aspect ratio (W/H) is equal to or less than 1.

The base of the catalyst carrier may be in a wave-like shape extending back and forth between a pair of channel members opposing in a width direction of the channel. The wave-like shape may be, e.g., a triangular-wave-like shape, a sinusoidal-wave-like shape, or a rectangular-wave-like shape.

Spaces opening to the channel member are formed by the wave-shaped base extending back and forth between a pair of the channel members, so as to overlap each other in the arrangement direction of the flat plates in the channel. In other words, the laterally-opening spaces overlapping each other in the vertical direction are formed such that a side to which the space opens is alternately switched. Since each of the channels is in the square or vertically-elongated shape as described above, the length of the channel in the horizontal direction is relatively short. Thus, the length of each of the closed spaces formed by the channel member in the horizontal direction is relatively short. This allows fluid to smoothly flow toward the channel member, thereby accelerating the heat transfer.

The base of the catalyst carrier may contact at least one of the flat plate or the channel member. Thus, the heat exchange efficiency of the catalytic reactor can be improved because of a heat transfer between the catalyst carrier and the flat plate or between the catalyst carrier and the channel member.

In addition, since the base of the catalyst carrier contacts the flat plate and the channel member, the base can be fixed in the channel. In this regard, the base of the catalyst carrier preferably contacts both of a pair of opposing wall surfaces of four wall surfaces defining the channel.

The channel member may be a corrugated plate. Particularly in the configuration in which the first and second paths are stacked in tiers, a configuration similar to that of a plate-fin heat exchanger including a corrugated fin is allowed. Thus, a cost for manufacturing the catalytic reactor is reduced.

Advantages of the Invention

As described above, in the catalytic reactor, since the channel has the square or vertically-elongated cross section, the thickness of the flat plate and the channel member can be reduced, and therefore the reduction in size and weight of the catalytic reactor can be realized. In addition, since the base of the catalyst carrier inserted into the channel is formed in the wave-like shape with the single piece structure, the fluid movement in the channel is not blocked, and therefore the heat exchange efficiency and the reaction efficiency of the catalytic reactor can be improved.

DESCRIPTION OF EMBODIMENTS

Figure 1:
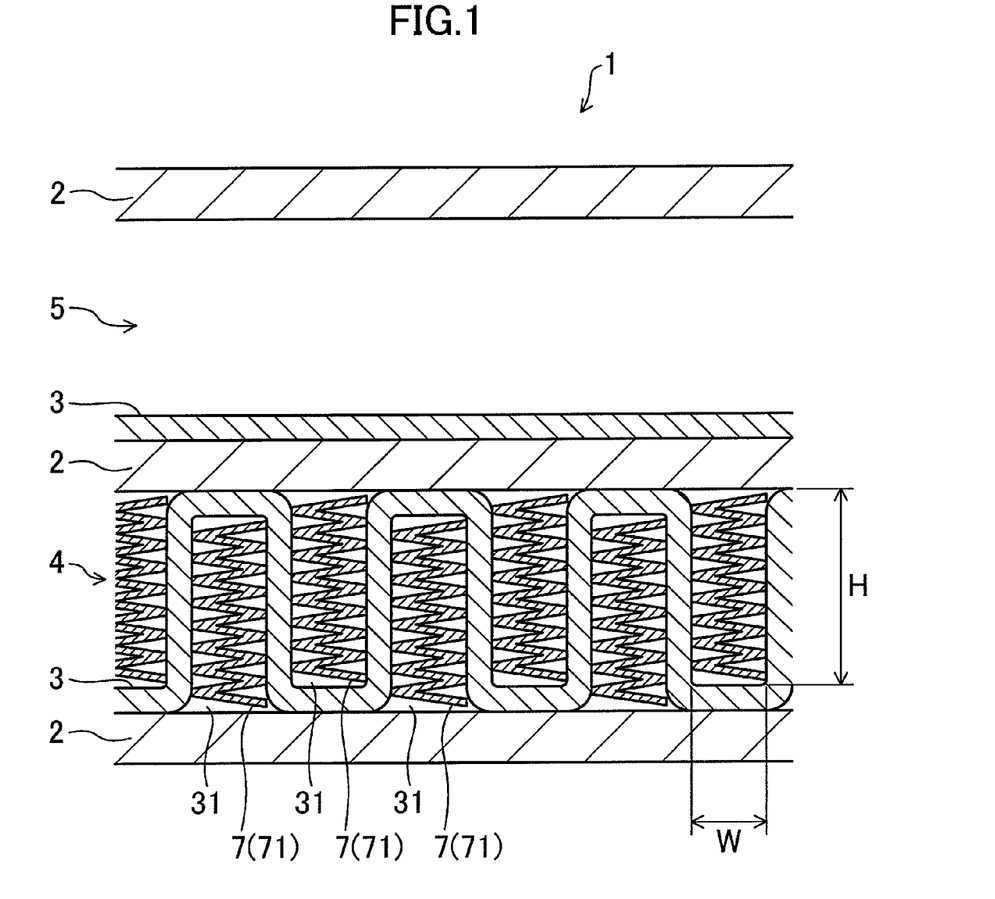
FIG. 1 is a cross-sectional view illustrating a cross section of a catalytic reactor.

An embodiment of a catalytic reactor will be described below with reference to drawings. Note that the following embodiment will be set forth merely for the purpose of preferred examples in nature. FIG. 1 is a cross-sectional view of an example of a catalytic reactor 1. The catalytic reactor 1 is a reactor used for a GTL process in which synthesis is performed to generate liquid fuel from raw material gas (e.g., associated gas). The GTL process will be briefly described below. The GTL process includes the steps of generating synthesis gas from raw material gas by a steam reforming reactor, and converting the generated synthesis gas into high hydrocarbon in a liquid form under normal conditions and water by a Fischer-Tropsch reactor (FT reactor). The catalytic reactor 1 may be used as both of the steam reforming reactor and the FT reactor.

The catalytic reactor 1 includes a plurality of tube plates 2 and a plurality of corrugated fins 3, and has a structure similar to that of a so-called "plate-fin heat exchanger." Specifically, the tube plate 2 has a flat plate shape, and the plurality of tube plates 2 are arranged in parallel at predetermined intervals. Note that FIG. 1 illustrates only three tube plates 2, but more than three tube plates 2 may be arranged in parallel. The number of the tube plates 2 may be set as necessary. Since the plurality of tube plates 2 are arranged in parallel, a first path 4 in which first fluid flows and a second path 5 in which second fluid flows are arranged in tiers with the tube plate 2 being interposed therebetween. The tube plate 2 functions as a first heat-transfer surface through which heat is transferred between the first path 4 and the second path 5.

The corrugated fin 3 is configured as a so-called "plain corrugated fin" which has a wave-shaped cross section in which a plurality of linearly-extending protrusions are arranged in parallel at equal intervals. Note that, other than the plain corrugated fin 3, a perforated corrugated fin in which through-holes are formed in a predetermined pattern may be employed. The corrugated fin 3 is arranged between adjacent ones of the tube plates 2 so as to contact the adjacent ones of the tube plates 2. The corrugated fin 3 is bonded to the adjacent tube plates 2 by, e.g., brazing. Thus, an inside of each of the first path 4 and the second path 5 is divided into a plurality of channels 31 arranged in parallel by the corrugated fin 3, and the corrugated fin 3 functions as a second heat-transfer surface. In the example illustrated in the figure, the corrugated fin 3 is arranged in the first path 4 so that fluid flows in a direction perpendicular to a plane of paper, and, on the other hand, the corrugated fin 3 is arranged in the second path 5 so that fluid flows in a right-left direction of the plane of paper. The catalytic reactor 1 illustrated in the figure is configured as a so-called "cross-flow catalytic reactor." The configuration of the catalytic reactor 1 is not limited to the foregoing, and the catalytic reactor 1 may be configured as, e.g., a countercurrent catalytic reactor in which, in each of first and second paths 4 and 5, a corrugated fin 3 is arranged so that fluid flows in the right-left direction of the plane of paper.

Note that a sidebar which is not shown in the figure is arranged between adjacent ones of the tube plates 2 in a circumferential edge part of the catalytic reactor 1. In addition, in the catalytic reactor 1, introduction sections for respectively introducing the first and second fluids to the first path 4 and the second path 5 are provided, and discharge sections for respectively discharging the first and second fluids from the first path 4 and the second path 5 are provided.

Figure 2A:
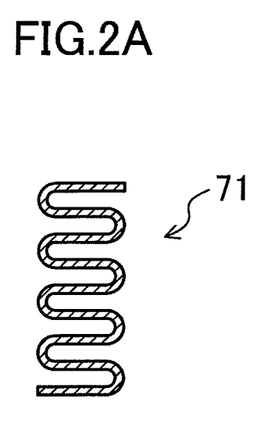
FIG. 2A is a cross-sectional view illustrating a variation of a catalyst carrier.
Figure 2B:
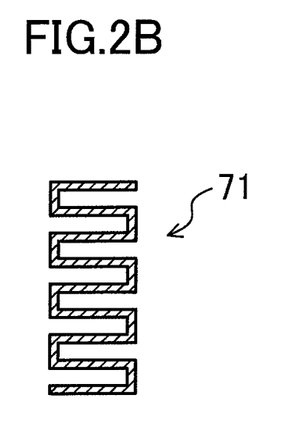
FIG. 2B is a cross-sectional view illustrating another variation of the catalyst carrier.

A catalyst carrier 7 extending along the channel 31 is inserted into each of the channels 31 in the first path 4 of the catalytic reactor 1, and therefore the first path 4 serves as a catalytic reaction path of the catalytic reactor 1. The catalyst carrier 7 includes a base 71 and a catalyst formed on a surface of the base 71. Note that the catalyst is not shown in, e.g., FIG. 1. In the present example, the base 71 is formed so as to have a triangular-wave-shaped cross section in which a triangular valley and a triangular ridge are alternately arranged. Although not shown in detail, the base 71 is a so-called "plain base" in which each of the valleys and the ridges linearly extends along the channel 31. As described above, although the base 71 has a single piece structure including a single member, the wave-shaped cross section of the base 71 allows the base 71 to substantially uniformly extend across an entire area of a cross section of the channel 31, thereby ensuring a sufficient catalyst area. The base 71 of the catalyst carrier 7 may have a cross-sectional shape similar to a sinusoidal wave, in which an arc-shaped ridge and an arc-shaped valley are alternately arranged as illustrated in, e.g., FIG. 2A. Alternatively, the base 71 of the catalyst carrier 7 may have a cross-sectional shape similar to a rectangular wave, in which a rectangular ridge and a rectangular valley are alternately arranged as illustrated in, e.g., FIG. 2B. Although not shown in the figure, the base may be a perforated base in which through-holes are formed in a predetermined pattern, other than the plain base 71. Alternatively, the base may be a herringbone base in which each of ridges and valleys extends so as to meander along the channel 31, or may be a serrated base in which slits are arranged at predetermined intervals so as to separate ridges and valleys and the positions of the separated ridges and the separated valleys are displaced from each other.

The wave-shaped base 71 extending back and forth between wall surfaces of the corrugated fin 3 is inserted into the channel 31, thereby dividing the channel 31 into a plurality of spaces. Each of the spaces is a space opening to the wall surface of the corrugated fin 3 (i.e., the second heat-transfer surface) in a lateral direction. In addition, as illustrated in FIG. 1, the base 71 of the catalyst carrier 7 contacts the corrugated fin 3. Note that, although the base 71 does not contact the tube plate 2 in this figure, the base 71 may contact the tube plate 2. As will be described later, the base 71 preferably contacts at least one of the corrugated fin 3 or the tube plate 2 considering a heat transfer. Note that the contact of the base 71 to the corrugated fin 3 and/or the tube plate 2 allows an advantage that the base 71 can be stably arranged in the channel 31. Considering such stable arrangement, the base 71 preferably contacts each of a pair of the wall surfaces of the corrugated fin 3, which face the lateral direction and oppose each other.

Although not shown in the figure, in a case where the catalytic reactor 1 is used as the steam reforming reactor, a catalyst carrier is also inserted into each of the channels 31 of the second path 5. The configuration of such a catalyst carrier may be the same as that of the catalyst carrier 7 of the first path 4.

In the case where the catalytic reactor 1 is used as the steam reforming reactor, raw material gas mainly made of methane and steam are, as the first fluid, introduced into the first path 4 which is the catalytic reaction path, and fuel such as methane or hydrogen is, as the second fluid, introduced into the second path which is also the catalytic reaction path. The base of the catalyst carrier may be made of a material on which an adhesive surface coating of aluminum oxide is formed by heating, such as aluminum-containing ferrite steel or iron containing chrome, aluminum, and yttrium. The preferable catalyst in the first path is a rhodium catalyst or a platinum/rhodium catalyst, and the preferable catalyst in the second path is a palladium catalyst. Since a stream reforming reaction is performed at more than 750° C., the catalytic reactor 1 may be made of, e.g., a material such as an iron/nickel/chrome alloy for high temperature or a material similar to such an alloy.

On the other hand, in a case where the catalytic reactor 1 is used as the FT reactor, gas mixture to be used for Fischer-Tropsch synthesis is, as the first fluid, introduced into the first path 4 which is the catalytic reaction path, and cooling fluid is, as the second fluid, introduced into the second path 5. The base 71 of the catalyst carrier 7 may be made of alloy steel on which an adhesive surface coating of aluminum oxide is formed by heating, such as aluminum-containing ferrite steel. In addition, the preferable catalyst includes a γ-alumina coating. Such a coating contains cobalt, an accelerating agent such as ruthenium, platinum, or gadolinium, and a basic accelerating agent such as lanthanum oxide. Since a FT reaction is performed at about 200° C., the catalytic reactor 1 may be made of, e.g., an aluminum alloy, stainless steel, a high-nickel alloy, or other steel alloy.

As one of features of the catalytic reactor 1, an aspect ratio (W/H) of a width W to a height H of the channel 31 is set to equal to or greater than 1. The height H is a height of the channel 31 in a stacking direction of the tube plates 2, and corresponds to an interval between the tube plates 2 as illustrated in FIG. 1. In addition, the width W corresponds to a distance between a pair of the opposing wall surfaces of the corrugated fin 3 as illustrated in FIG. 1. That is, each of the channels 31 of the first and second paths 4 and 5 has a square cross section in which the height H and the width W are equal to each other, or a vertically-elongated cross section in which the height H is greater than the width W.

The width W may be, e.g., 3-7 mm, and more preferably 3-5 mm. As will be described later, since the relatively narrow width W allows a reduction in thickness of the tube plate 2 and the corrugated fin 3, the upper limit of the width W may be set considering the foregoing point. In addition, since the catalyst carrier 7 is inserted into the channel 31, it is difficult to insert the catalyst carrier 7 into the channel 31 having the extremely-narrow width W. Thus, the lower limit of the width W may be set considering productivity.

The height H may be, e.g., 7-20 mm, and more preferably 7-10 mm. The height H corresponds to the interval between the tube plates 2, and corresponds to the height of the protrusion of the corrugated fin 3. Since the corrugated fin 3 functions as a reinforcing member between the tube plates 2, the upper limit of the height H may be set considering the strength of the corrugated fin 3. In addition, as in the foregoing, the lower limit of the height H may be set considering the productivity.

The aspect ratio may be W/H=1, supposing that the height H of the channel 31 is 7 mm and the width W of the channel 31 is 7 mm. Alternatively, the aspect ratio may be W/H=½, supposing that the height H is 10 mm and the width W is 5 mm. Needless to say, the aspect ratio may be set to a value other than the foregoing. Considering the range of the height H and the range of the width W as described above, a possible aspect ratio range is 1-³⁄₂₀.

As described above, the channel 31 of the catalytic reactor 1 having the foregoing configuration has the square or vertically-elongated cross section, and does not have a horizontally-elongated cross section. This allows the relatively-narrow pitch of the corrugated fin 3, thereby reducing the area of the tube plate 2 receiving the internal pressure of the first path 4 or the second path 5 (i.e., shortening the distance between the wall surfaces of the corrugated fin 3). Thus, even if the thickness of the tube plate 2 is reduced, flexural deformation of the tube plate 2 is reduced, and therefore the tube plate 2 withstands the internal pressure. In association with the foregoing, the thickness of the corrugated fin 3 can be reduced. This is advantageous to reduction in size and weight of the catalytic reactor 1.

The vertically-elongated cross section of the channel 31 means that a distance from a center position of the vertically-elongated cross section to the tube plate 2 which is the first heat-transfer surface is longer than that in a case where the channel 31 has the horizontally-elongated cross section. This results in degradation of heat exchange efficiency, thereby degrading reaction efficiency of the catalytic reactor 1. Particularly in a case where the catalyst carrier arranged in the channel 31 has a multilayer structure including many closed spaces as disclosed in, e.g., International Publication No. 2006/079848, a flow of fluid, in particular, in a direction perpendicular to a flow direction in the channel 31 is blocked, thereby further degrading the heat exchange efficiency.

On the other hand, in the catalytic reactor 1, the catalyst carrier 7 (i.e., the base 71) has the single piece structure with the wave-shaped cross section. Thus, although the catalyst area can be ensured, no closed space is formed, and therefore the flow of fluid in the channel 31 is not blocked. As a result, even if the cross section of the channel 31 is in the vertically-elongated shape which is disadvantageous to the heat exchange efficiency, the degradation of the heat exchange efficiency can be prevented, or the heat exchange efficiency can be improved to prevent the degradation of the reaction efficiency. In particular, since the base 71 of the catalyst carrier 7 is in the wave-like shape so as to extend back and forth in the lateral direction, many spaces opening in the lateral direction are formed. On the other hand, since the cross section of the channel 31 is in the vertically-elongated shape as described above, the length of the open space in the lateral direction is relatively short. This accelerates fluid movement to the second heat-transfer surface in the lateral direction, and therefore is advantageous to enhancement of the heat exchange efficiency.

Since the base 71 of the catalyst carrier 7 contacts the corrugated fin 3, the heat transfer is occurred between the catalyst carrier 7 and the corrugated fin 3, thereby improving the heat exchange efficiency of the catalytic reactor 1. Note that, if the catalyst carrier 7 and the tube plate 2 contact each other, the heat transfer is occurred between the catalyst carrier 7 and the tube plate 2, and therefore the catalyst carrier 7 preferably contacts at least one of the corrugated fin 3 or the tube plate 2. For enhancing the heat transfer efficiency between the catalyst carrier 7 and the corrugated fin 3 or between the catalyst carrier 7 and the tube plate 2, the catalyst carrier 7 may be bonded (e.g., brazed) to the corrugated fin 3 or the tube plate 2. On the other hand, if the catalyst carrier 7 is not bonded to the corrugated fin 3 or the tube plate 2, there is an advantage that the catalyst carrier 7 can be easily replaced.

The base 71 of the catalyst carrier 7 contacts the corrugated fin 3, i.e., contacts a pair of the laterally-facing wall surfaces of the corrugated fin 3 dividing the channel 31 as illustrated particularly in FIG. 1. Thus, the base 71 can be stably arranged in the channel 31. Although not shown in the figure, the wave-shaped base 71 may be elastically deformable in a direction in which the wave-like shape becomes flatter (in the example illustrated in FIG. 1, the base 71 may be elastically deformable in the vertical direction), and the elastically-compressed base 71 may be inserted into the channel 31. The base 71 contacts an upwardly-facing or downwardly-facing surface of the tube plate 2 and an upwardly-facing or downwardly-facing surface of the corrugated fin 3 by elasticity restoring force, and presses upwardly and downwardly against such surfaces. Consequently, arrangement stability of the base 71 can be further enhanced.

Figure 3:
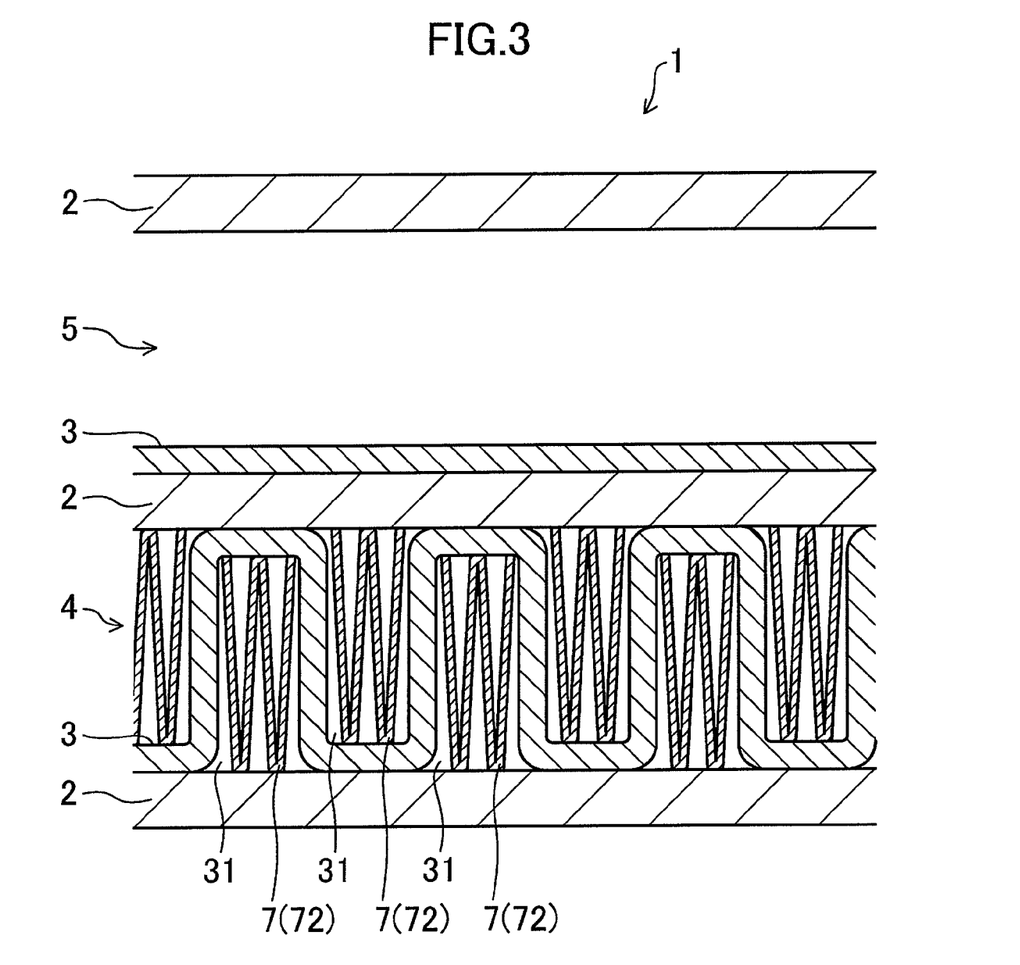
FIG. 3 is a cross-sectional view illustrating still another variation of the catalytic carrier.

Note that, in the catalytic reactor 1, the catalyst carrier 7 (i.e., the base 71) is in the wave-like shape so as to extend back and forth in the lateral direction, but a base 72 may extend back and forth in the vertical direction as illustrated in, e.g., FIG. 3. In such a case, since spaces each opening upwardly or downwardly to a tube plate 2 or opening upwardly or downwardly to a corrugated fin 3 are formed, a flow of fluid is not blocked. Although not shown in the figure, the base 72 may be also in a wave-like shape similar to a sinusoidal wave or in a wave-like shape similar to a rectangular wave, other than the triangular-wave-like shape illustrated in FIG. 3. The base 72 contacts the tube plate 2 and the corrugated fin 3 (i.e., an upwardly-facing or downwardly-facing wall surface of the corrugated fin 3). In addition, the base 72 may contact laterally-facing wall surfaces of the corrugated fin 3. Further, the base 72 may be elastically deformable in a direction in which the wave-like shape thereof becomes flatter (in the example illustrated in FIG. 3, the base 72 may be elastically deformable in the lateral direction). When the base 72 is arranged in the channel 31, the base 72 may contact each of the laterally-facing wall surfaces of the corrugated fin 3, thereby pressing such wall surfaces in the lateral direction.

In the catalytic reactor 1, the corrugated fin 3 is used to divide each of the first and second paths 4 and 5 into the plurality of channels 31, but the present invention is not limited to such a configuration. Although not shown in the figure, e.g., a plurality of square pipes may be arranged in each of the first and second paths 4 and 5, thereby forming a plurality of channels.

In the catalytic reactor 1, the cross-sectional shape of the channel 31 is the same between the first path 4 and the second path 5, but may be different between the first path 4 and the second path 5. That is, e.g., the cross-sectional shape of the channel 31 may be individually optimized depending on required performance in each of the first path 4 and the second path 5.

In the catalytic reactor 1, the first path 4 and the second path 5 are stacked one on another. Although not shown in the figure, the second path 5 may be omitted, and, e.g., a cooling device or a heating device may be attached to one of opposing surfaces of the tube plate 2, which is on an opposite side of the other surface defining the catalytic reaction path (i.e., the first path 4). In such a case, e.g., the cooling device or the heating device may be attached to one of a pair of tube plates 2 defining the catalytic reaction path, or may be attached to both of a pair of the tube plates 2. In the catalytic reactor having the foregoing configuration, fluid in the catalytic reaction path is cooled or heated by the cooling device or the heating device, thereby accelerating a catalytic reaction in the catalytic reaction path.

INDUSTRIAL APPLICABILITY

As described above, since the small lightweight catalytic reactor for which the degradation of the reaction efficiency is prevented is realized, the catalytic reactor disclosed herein is useful as the steam reforming reactor and the FT reactor particularly in the GTL process.

DESCRIPTION OF REFERENCE CHARACTERS

1 Catalytic Reactor
2 Tube Plate (Flat Plate)
3 Corrugated Fin (Channel Member, Corrugated Plate)
31 Channel
4 First Path
5 Second Path
7 Catalyst Carrier
71 Base
72 Base

The invention claimed is:
1. A catalytic reactor, comprising:
a pair of flat plates arranged in parallel at a predetermined interval so as to form a path in which fluid flows;
a channel member bonded to the flat plates in the path to divide the path into a plurality of channels arranged in parallel; and
a catalyst carrier inserted into each of the channels and extending along the each of the channels,
wherein one of opposing surfaces of at least one of the pair of flat plates, which is on an opposite side of the other surface defining the path, serves as a first heat-transfer surface when contacting a temperature medium having a temperature zone different from a temperature zone in the path and exchanging heat with the temperature medium,
the channel member bonded to the flat plates serves as a second heat-transfer surface,
each of the channels has a cross section for which an aspect ratio (W/H) of a width W to a height H corresponding to a stacking direction of the flat plates is equal to or less than 1, and
the catalyst carrier includes a wave-shaped base having a single piece structure, and a catalyst formed on a surface of the base, and
the base of the catalyst carrier is in a wave-like shape extending back and forth between a pair of channel members opposing in a width direction of the channel.
2. The catalytic reactor of claim 1, wherein
a plurality of flat plates are arranged in parallel at predetermined intervals, and each of the flat plates divides between adjacent ones of a plurality of paths such that the paths are stacked in tiers,
the plurality of paths includes a first path in which first fluid flows and a second path in which second fluid flows, and the first and second paths are alternately arranged in tiers,
the channel member divides each of the first and second path into the channels, the catalyst carrier is inserted into each of the channels in at least one of the first or second path, and the at least one of the first or second path serves as a catalytic reaction path, and each of the channels of the catalytic reaction path has a cross section for which the aspect ratio (W/H) is equal to or less than 1.

3. The catalytic reactor of claim 1, wherein
the base of the catalyst carrier contacts at least one of the flat plate or the channel member.

4. The catalytic reactor of claim 1, wherein
the channel member is a corrugated plate.

\* \* \* \* \*